United States Patent [19]
Goldstein et al.

[11] Patent Number: 5,702,582
[45] Date of Patent: Dec. 30, 1997

[54] MULTI-PORT MULTI-STREAM VALVE APPARATUS

[75] Inventors: Arthur L. Goldstein; Theodore G. Papastavros, both of Weston; Emery J. Richard, Lynn, all of Mass.

[73] Assignee: Ionics, Incorporated, Watertown, Mass.

[21] Appl. No.: 584,665

[22] Filed: Jan. 11, 1996

[51] Int. Cl.⁶ ............................................. B01D 61/48
[52] U.S. Cl. ........................ 204/632; 204/634; 204/635
[58] Field of Search .............................. 204/632, 634, 204/635

[56] References Cited

U.S. PATENT DOCUMENTS

| | | |
|---|---|---|
| 1,495,317 | 5/1924 | Caps . |
| 1,620,717 | 3/1927 | Brice et al. . |
| 1,910,753 | 5/1933 | Colvin . |
| 1,914,333 | 6/1933 | Staegemann . |
| 1,933,370 | 10/1933 | Dotterweich .................. 210/24 |
| 1,937,330 | 11/1933 | Brice .............................. 210/24 |
| 1,954,405 | 4/1934 | Dotterweich .................. 210/24 |
| 2,111,169 | 3/1938 | Clark ............................. 251/87 |
| 2,146,983 | 2/1939 | Pick ............................... 210/24 |
| 2,240,163 | 4/1941 | Pick ............................... 277/20 |
| 5,292,422 | 3/1994 | Liang et al. ................... 204/632 |

OTHER PUBLICATIONS

Wood and Jones, *Proc. Am. Soc. Chem. Eng.*, J. Hydraulic Div. 99, 167–178 (1973) Jan.

*Primary Examiner*—Arun S. Phasge
*Attorney, Agent, or Firm*—Lappin & Kusmer LLP

[57] ABSTRACT

Apparatus for selecting connections from each of two or more inlet streams, at least two of which flow simultaneously, to one or more exit streams of a group of at least two. The apparatus has at least one rotatable first body, a first surface of which is adjacent to a first surface of a second body. The first body provides at least first and second fluid conduits, at least one end of each conduit terminating at the first surface of the first body. The second body also provides at least first and second fluid conduits, at least one end of each conduit terminating at the first surface of the second body. The first ends of each conduit provided by the first body and the first ends of each conduit provided by the second body are in such predetermined positions that the first conduit of the first body communicates with the second conduit of the second body. When such first body is rotated by a predetermined angle then the first conduit of the first body communicates with the second conduit of the second body and the second conduit of the first body communicates with the first conduit of the second body. The apparatus may be integrated into an end plate or end block of a reversing type electrodialysis or electrodeionization stack.

11 Claims, 8 Drawing Sheets

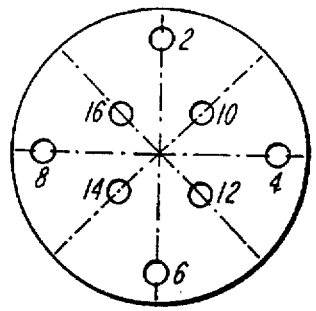 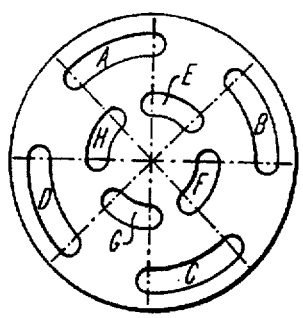 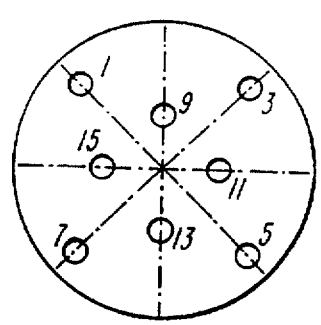
*FIG. 6A*   *FIG. 6B*   *FIG. 6C*
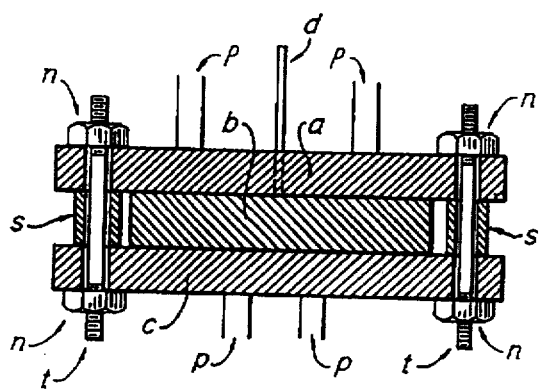
*FIG. 7A*
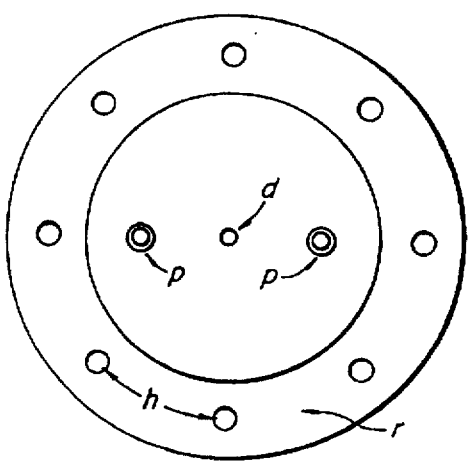
*FIG. 7B*
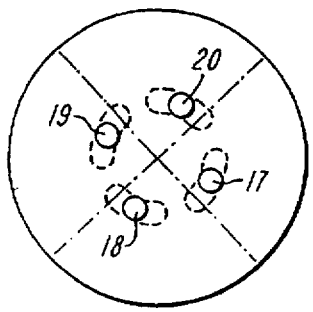 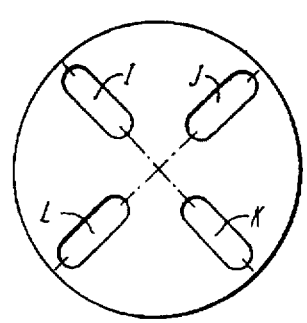 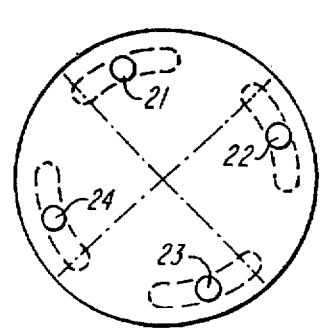
*FIG. 8A*   *FIG. 8B*   *FIG. 8C*

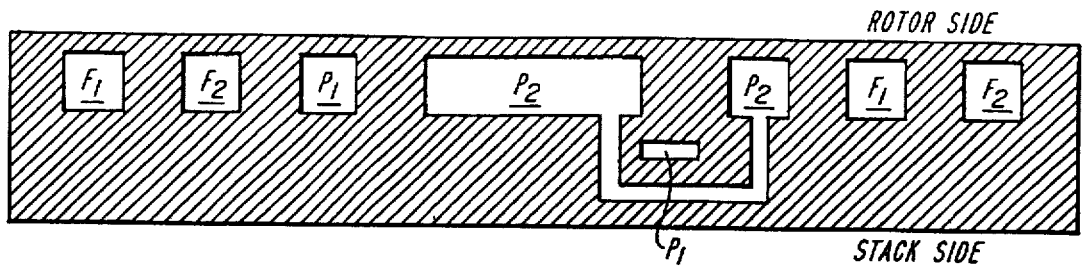
FIG. 9F
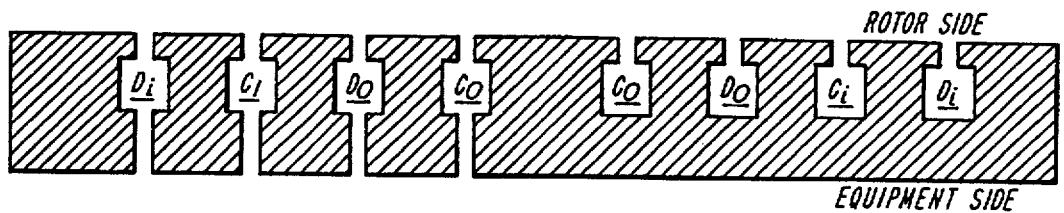
FIG. 9G
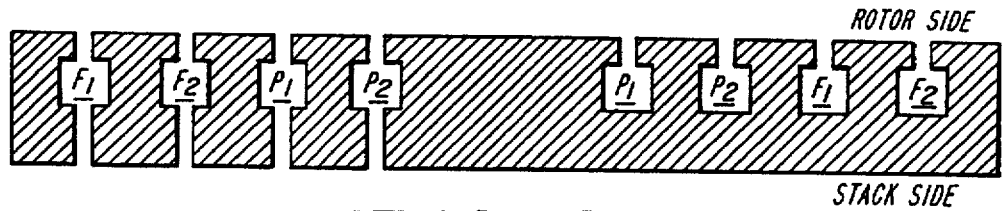
FIG. 9H
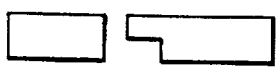
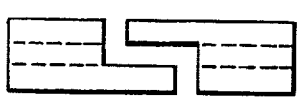
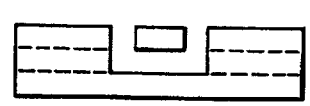
FIG. 10A    FIG. 10B    FIG. 10C
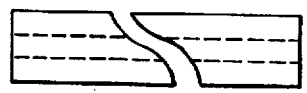
FIG. 10D    FIG. 10E    FIG. 10F

MULTI-PORT MULTI-STREAM VALVE APPARATUS

BACKGROUND OF THE INVENTION

1. Field of the Invention

The invention pertains to apparatus or devices, e.g. valves, for making connections between each of two or more first fluid streams, at least two of which flow simultaneously, with one or more second fluid streams. The invention may be applied, for example, to reversing type electrodialysis ("EDR") or reversing type electrodeionization ("EDIR") which may each utilize two or more separate simultaneously flowing fluid streams. The apparatus of the invention may be integrated into an end plate or end block of an EDR or EDIR stack.

2. Description of Prior Art

Single-stream, multi-port valves for diverting one fluid stream to each of several outlets one at a time have been known for many years (see for example U.S. Pat. Nos. 1,620,717; 1,910,753; 1,933,370; 1,937,330; 1,954,405; 2,111,169; and 2,146,983). They have been developed for ion exchange, for example. A nest of valves had been installed on early ion exchange units. Such nests were inconvenient to operate and sometimes led to errors in operation. The single-stream, multiport valves were and are capable of directing the flow of hard water through an ion exchange unit in the necessary steps, i.e. back-washing, regenerating, rinsing and finally service (i.e. exhaustion) with a single, step-wise, revolution of the valve mechanism. A single stream, multiport valve used in early ion exchange units is illustrated in FIG. 1. Such valve and interconnecting piping were mounted on the ion exchange tank. The valve passed through four settings with one revolution of the valve mechanism:

a) when the position indicator was moved from the "Soften" position, the ion exchange unit was taken off its "operating" (i.e. exhaustion) run. When the valve was rotated sufficiently for the position indicator to reach "Wash" the back-wash (upflow-wash) was started;

b) when the back-wash was completed, regeneration was started by rotating the valve to "Brine", which placed the valve in the regeneration position, an ejector pulling brine out of a storage tank;

c) regeneration was ended by rotating the valve to "Rinse" thereby starting the rinse step; and d) rinsing was ended and softening again started by rotating the valve further to the "Soften" position, thereby completing the cycle.

Such a valve obviously selected one output stream at a time, i.e. "Softening", "Backwash", "Regeneration" and "Rinsing", and did not simultaneously divert more than one stream.

Early multiport valves, as used in ion exchange, consisted of a flat, composition faced, distributing slide which was kept in tight contact with a stationary port plate. The slide was rotated from one position to another and permitted hard water to enter the proper exit port in each step of the cycle. The influent hard water was admitted through the side of the stationary port plate and then directed to the top of the rotatable slide from which it was directed by an opening in the slide to an effluent opening in the stationary port plate. The inlet water pressure acting on the top of the slide, aided by the pressure of a spring, held the rotatable slide firmly against the stationary port plate. Small ion exchange units were often designed with the multi-port, single stream valve mounted on top of the ion exchange tank, thereby eliminating external piping. One type of single stream, multi-port valve was so designed that the rotating slide was separated from the stationary port plate by lifting a lever prior to rotation (U.S. Pat. No. 2,111,169).

Automatically operated multiport valves have been in use since at least 1935 (see U.S. Pat. Nos. 1,495,317; 1,914,333; 1,933,370; 1,954,405; and 2,240,163). For example, an electric motor was used to rotate the slide of a multi-port valve. The length of an "operating" run was controlled by an electric contact integrating flow meter or an electric timer. When the set point on either controller was reached, an electric switch was closed, starting the electric motor connected to the multi-port valve. The motor continued until the slide of the valve reached the back-wash position where an electrical contact switch opened and stopped the motor and started an electric timer. After a set time was reached, the timer reactivated the motor which then rotated the slide to the "regeneration" position, allowing regenerant into the ion exchange unit from a regenerant tank. A float switch in the latter closed, again reactivating the motor which then moved the slide to the "rinse" position when another electric contact was opened, the motor again stopped and a timer started. When the set rinse time was reached, the timer again started the motor, turning the slide to the "operating" position, completing the cycle.

Such manual or motor operated multiport valves, as noted above, activate one stream at a time, in sequence, e.g.:

1. Water to be softened (i.e. "service" water) is directed into the top of the ion exchange tank and out of the bottom to use;
2. Back-wash hard water is then directed through the valve into the bottom of the tank and out the top to waste;
3. Regenerant is then directed by the valve into the top of the tank and out the bottom to waste;
4. Rinse water then passes through the valve into the top of the tank and out of the bottom to waste.

In contrast to the above, some processes require the simultaneous diversion of two or more fluid streams, e.g. EDR; EDIR; reversing or back-washing type ultrafiltration ("UF") or microfiltration ("MF"); ion exchange deionizers consisting of acid regenerated cation exchangers and alkali regenerated anion exchangers; carousel-type acid and base regenerated chelating cation exchangers; cycling type heat recuperators (i.e. where a hot(cold) fluid is first used to heat up (cool down) a heat (cold) storage body and the latter is subsequently used to heat (cool) a cold (hot) fluid) as well as many other processes obvious to those skilled-in-the-art. Illustrative of such processes are EDR and EDIR represented schematically in FIG. 2 in which "C" represents cation exchange membranes ("CXM"), which conduct electric current almost exclusively by means of low molecular weight, positively charged ions ("cations") dissolved in water or other ionizing solvent, and "A" represents anion exchange membranes ("AXM") which conduct electric current almost exclusively by means of low molecular weight, negatively charged ions ("anions") dissolved in the same liquid as the cations. The cations most often encountered are $Na^+$, $K^+$, $Ca^{++}$ and $Mg^{++}$. The anions most often encountered are $Cl^-$, $SO_4^=$, $HCO_3^-$, $NO_3^-$ and $F^-$. The membranes are generally from about 0.1 to about 0.5 millimeters thick and may have areas available to conduct electric current ranging from about 0.3 to about 3.0 square meters. The membranes are separated from each other by flat gaskets ranging in thickness from about 0.3 to 3.0 millimeters resulting in inter-membrane spaces ("chambers", "cells", "compartments") 1 through 10. (In commercial EDR or EDIR there may be several hundred such compartments). There are two classes of such compartments: the odd numbered compartments which have CXM on their left hand sides and AXM on their right hand sides; and the even numbered compartments which are mirror images of the odd numbered compartments, i.e. the even numbered compartments have CXM on their right hand sides and AXM on their left hand sides. A manifold $F_1$ carries a first feed solution of electrolyte into the odd numbered compartments and a manifold $F_2$ carries a second feed solution of electrolyte into the even numbered compartments. A manifold $P_1$ carries a first product solution of electrolyte out of the odd numbered compartments and a manifold $P_2$ carries a second product solution of electrolyte out of the even numbered compartments. The group of membranes and intermembrane gaskets is known in the trade as a "stack" or "pack". A stack or pack is terminated at each end by electrodes e.g. $E_1$ and $E_2$ (preferably of Ti electroplated with Ir) which may be separated from the adjacent ion exchange membranes by gaskets forming electrode compartments $E'_1$ and $E'_2$. Conduits $R_1$ and $R_2$ carry electrolyte solutions into compartments $E'_1$ and $E'_2$ respectively and conduits $R'_1$ and $R'_2$ carry away effluents from such compartments. (Although the electrodes $E_1$ and $E_2$ are shown as spaced from the adjacent membranes, they may in fact be foraminous and in contact with the membranes or even partly embedded in the adjacent membrane surface). It will be seen that the apparatus is symmetric (reflected) around the AXM separating compartments 5 and 6. Further the apparatus is symmetric (reflected) around a plane perpendicular to the page and passing through the mid-point of the membranes. Therefore the feeds to the stack could as easily be $P_1$, $P_2$, $R'_1$ and $R'_2$ and the effluents $F_1$, $F_2$, $R_1$ and $R_2$. In operation electrolyte solutions are passed through the various compartments and a direct current potential of about 1 volt per membrane is applied between $E_1$ and $E_2$. Because of the symmetry it makes no difference which electrode is positively charged and which negatively. Arbitrarily choosing $E_1$ as the negatively charged electrode ($E_2$ will then necessarily be positively charged), positively charged ions (i.e. cations such as $Na^+$, $K^+$, $Ca^{++}$ and $Mg^{++}$) in all the compartments will be attracted toward $E_1$ (repelled by $E_2$), since, as is well known, unlike charges attract each other and like charges repel each other. Those cations in stream $F_1$ in the odd numbered compartments (in FIG. 2) can pass through the CXM ("C" in the figure) into the even numbered compartments but once in the latter they and the cations in feed solution $F_2$ passing through the even numbered compartments can go no further toward $E_1$. This phenomenon is due to the fact that CXM conduct electricity almost solely by means of low molecular weight cations but AXM are passage resistant to cations. At the same time, negatively charged ions (i.e. anions such as $Cl^-$, $SO_4^=$, $HCO_3^-$, $NO_3^-$ and $F^-$) in all the compartments are attracted toward $E_2$. Anions in stream $F_1$ in the odd numbered compartments can pass through the AXM ("A" in FIG. 2) into the even numbered compartments but once there they and the anions in feed solution $F_2$ passing through the even numbered compartments can go no further toward $E_2$. This phenomenon is due to the fact that AXM conduct electricity almost solely by means of low molecular weight anions but CXM are passage resistant to anions. Because of the enormous electric potential difference required to maintain any measurable charge separation, the net movement of positive charges through the CXM is equal to the net movement of negative charges through the AXM. The net result of the movement of ions is that product stream $P_1$ has become partially deionized with respect to feed stream $F_1$ and the ions removed from $F_1$ are carried out of the stack in product stream $P_2$.

The electric current passing through the stack of membranes and intermembrane gaskets is carried by $Na^+$, $Ca^{++}$, $Mg^{++}$, $K^+$, $Cl^-$, $SO_4^=$, $NO_3^-$, $F^-$ and perhaps other low molecular weight ions of other chemical elements. However the electric current carried outside the stack to and from the electrodes $E_2$ and $E_1$ is carried by electrons, generally through metallic conductors. The metallic conductors are passage resistant to the ions passing through the stack and the stack is passage resistant to the electrons passing through the metallic conductors. Hence at the electrodes there must be a conversion between charge carriers. At the negatively charged electrode ("cathode", $E_1$ in the above discussion), the charge conversion is:

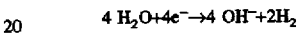

and at the positively charged electrode ("anode", $E_2$), the conversion is:

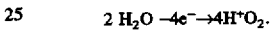

Typically the feed $R_1$ to electrode compartment $E_1'$ may contain $Ca^{++}$ and $HCO_3^-$ ions, in which case, because of the $OH^-$ ions formed at $E_1$, insoluble calcium carbonate may precipitate in $E_1'$:

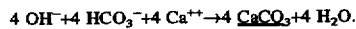

Further, the feed $F_2$ to the even numbered (concentrating) compartments may contain $Ca^{++}HCO_3$ and/or $SO_4^=$ near their mutual solubility limits so addition through the membranes of $Ca^{++}$, $HCO_3^-$ and/or $SO_4^=$ from feed stream $F_1$ may result in precipitation of $CaCO_3$ and/or $CaSO_4$ in such concentrating compartments. The above mentioned precipitates, if substantial, may hinder passage of fluid and/or electricity through the compartments affected. However, if after some period of time (depending on the quantity of precipitate accumulated), the polarities of $E_1$ and $E_2$ are reversed (see e.g. U.S. Pat. No. 2,863,813), then at $E_1$ the charge conversion is:

$2H_2O \rightarrow 4e^- \rightarrow 4 H^+ + O_2$ and any $CaCO_3$ present will be solubilized and flushed out in $R'_1$:

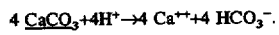

The even numbered compartments become demineralizing compartments and any precipitates of $CaCO_3$ and/or $CaSO_4$ therein will be redissolved, transferred to the odd numbered (then) concentrating compartments and flushed out in $P_1$. After some period of time, precipitate of $CaCO_3$ may accumulate in $E'_2$ (since $E_2$ has become negatively charged) and $CaCO_3$ and/or $CaSO_4$ precipitate may accumulate in the odd numbered compartments (which have become concentrating compartments). The polarities of $E_1$ and $E_2$ may again be switched (back to their original polarities) and the resolubilization and precipitation processes repeated. Such reversals may be continued in an endless cycle. The frequency of reversal will depend upon the severity of the precipitation, ranging from once every quarter of an hour to once in several months. The reversal may be symmetric, i.e. the time the current passes in one direction may be substantially equal to the time it passes in the other direction. If the precipitation is not severe, the reversal need not be symmetric, e.g. it may be 59 minutes in one direction and 1 minute in the other direction.

Ion exchange ("IX") resin beads have about the same electrical resistance as an aqueous solution having about 0.3 gram-equivalents of sodium chloride per liter (about 17,500 milligrams per liter, i.e. ppm). Hence if the concentration of electrolyte in the solution being demineralized by electrodialysis ("ED") is very much less than 0.3N, then it may be advantageous to fill the compartments of the ED stack with IX beads. In such case the beads not only can reduce the electrical resistance of the ED stack (thereby resulting in increased current density, i.e. in increased transfer of electrolyte) but also can serve as an extension of the membrane surface area, thereby decreasing the actual current density for whatever current is passed. The IX beads can be AX beads or CX beads or a mixture of both, depending upon the details of the application. When such beads are not used, then the inter-membrane spacing may be about 0.5 millimeters and the space between the membranes not occupied by the inter-membrane gaskets may be filled with woven or non-woven screen or expanded plastic screen. Preferably such screen is oriented so the flow frequently changes direction by about 90°. Such frequent change in direction serves to induce convective mass transfer of electrolyte to and from the membranes. When the compartments are filled with IX beads then the inter-membrane spacing may be 3 millimeters or more.

When reversing type ED (that is "EDR") is used (whether or not the compartments are filled with IX beads) then the functions of streams $F_1$, $F_2$, $P_1$, $P_2$, $R_1$, $R_2$, $R'_1$ and $R'_2$ also change. For example $P_1$ will change back and forth from partially demineralized product to concentrated product while simultaneously $P_2$ will change back and forth from respectively concentrated product to partially demineralized product. Furthermore the feeds $F_1$ and $F_2$ to the demineralizing and concentrating chambers may not be parts of the same solution. The feed to the demineralizing compartments may, for example, be a concentrated cheese whey and/or the feed to the concentrating compartments may consist in part of recycled effluent from the concentrating compartments in an effort to concentrate such effluent to a level which would not be feasible in the absence of such recycle. During the changeover from concentrating compartment to demineralizing compartment, the first effluent from the latter will still have the composition of a concentrated effluent and will after a short time (compared to the time between successive reversals) assume the composition of the desired demineralized product. Such changeover time between compositions will depend on the hold-up time of the compartments, i.e. on the ratio of the volume of each compartment to the volumetric flow rate to such compartment. For example if the flow path length in a compartment is 488 centimeters and the flow rate is 20 cubic centimeters per second per square centimeter of flow path crosssection (i.e. a superficial velocity of 20 centimeters per second) then the hold up time is about 24 seconds in such compartment. During the changeover time, the first portion of the effluent from the demineralized compartments may, if desired, be segregated from the "normal" demineralized effluent. The sequence for a complete cycle may therefore be:

Obverse Operation (right hand electrode in FIG. 2 positive):
Step 1, Normal Operation:
$F_1$ is dilute chamber feed;
$F_2$ is concentrate chamber feed;
$R_1$ is negative electrode feed;
$R_2$ is positive electrode feed;
$P_1$ is dilute effluent;
$P_2$ is concentrate effluent;
$R'_1$ is negative electrode effluent; and
$R'_2$ is positive electrode effluent.

Reverse Operation (right hand electrode in FIG. 2 negative):
Step 2, Transition Period:
$F_1$ is concentrate feed;
$F_2$ is dilute feed;
$R_1$ is positive electrode feed;
$R_2$ is negative electrode feed;
$P_1$ is initially dilute, next intermediate, finally concentrated;
$P_2$ is initially concentrated, next intermediate, finally dilute;
$R'_1$ is positive electrode effluent; and
$R'_2$ is negative electrode effluent.

Step 3, Normal Operation:
$F_1$ is concentrate feed;
$F_2$ is dilute feed;
$R_1$ is anode feed;
$R_2$ is cathode feed;
$P_1$ is concentrate effluent;
$P_2$ is dilute effluent;
$R'_1$ is anode effluent; and
$R'_2$ is cathode effluent.

Obverse Operation (right hand electrode in FIG. 2 is again positive):
Step 4, Transition Period:
$F_1$ is dilute feed;
$F_2$ is concentrate feed;
$R_1$ is cathode feed;
$R_2$ is anode feed;
$P_1$ is initially concentrated, finally dilute;
$P_2$ is initially dilute, finally concentrated;
$R'_1$ is cathode effluent; and
$R'_2$ is anode effluent.

The above is a brief summary of reversing type ED or EDR. Apparatus well-known in the art for carrying out such processes may be schematically illustrated as shown in FIG. 3 in which 30 is an ED or EDI stack having electrical stages 31 and 32 terminated by electrodes $E_1$, $E_2$ and $E_3$ using the designators of FIG. 2. $E_1$ and $E_3$ have the same polarity which is opposite in sign to that of $E_2$. 31 and 32 each consist of packs as shown in FIG. 2. 33 and 34 are pumps respectively for the dilute and concentrate streams. 35,36, 37, 38 and 39 are three way valves. In operation feed solution enters the apparatus through conduit 46 and divides between pumps 33 and 34. In the obverse operation:

$E_2$ is positive, $F_1$ is the dilute chamber feed connected by valve 35 with pump 33;

$F_2$ is the concentrate chamber feed connected by valve 36 to pump 34;

$P_1$ is the dilute effluent connected by valve 37 to dilute product conduit 43;

$P_2$ is the concentrate effluent connected by valve 38 to concentrate product conduit 41.

Part of such concentrated effluent is recycled by conduit 42 to pump 34 in order to increase the concentration of such effluent.

The feeds to and the effluents from the electrodes are not shown in FIG. 3.

At the beginning of the 1st transition period, valves 35 and 36 are switched, valve 35 then connecting pump 33 with conduit $F_2$ and valve 36 connecting pump 34 with conduit $F_1$. Such switching creates a diffuse, moving front between concentrated solution initially present in $F_2$ (and the even numbered chambers of FIG. 2) and the feed solution now entering $F_2$ from valve 35. Similarly the switching creates a diffuse, moving front between dilute solution initially present in $F_1$ (and the odd numbered chambers of FIG. 2) and the concentrated solution now entering $F_1$ from valve 36. As noted above, if the path length in each pack 31 and 32 of FIG. 3 is 488 centimeters and the flow rate is 20 centimeters per second, then the fronts will take about 24 seconds to clear each pack. Hence about 50 seconds after valves 35 and 36 switch, the polarity of $E_2$ should be changed to negative and valves 37 and 38 switched. Valve 37 will then connect $P_1$ (now the concentrate stream) to conduit 41 and valve 38 will connect $P_2$ (now the dilute stream) to conduit 43. Conductivity controller 40 monitors the conductivity of the dilute stream in conduit 43 and if such conductivity is above the desired value then 3-way valve 39 diverts such stream until the conductivity of the dilute stream is satisfactory. Operation is then in the reverse mode and continues until the 2nd transition period when valves 35 and 36 are switched back to the positions they had during obverse operation. Again after about 50 seconds the polarity of $E_2$ is changed back to positive and valves 37 and 38 are switched back to the positions they had during obverse operation. Any off-spec product is again diverted by conductivity controller 40 and valve 39. Cycling between obverse and reverse operation continues indefinitely.

By way of example, the flows in $F_1$ and $F_2$ may each be about 92 U.S. gallons per minute, appropriately handled by nominal 2" PVC Schedule 80 pipe. The flow velocity is therefore about 10 feet per second. Valves 35 through 39 may then be 2" 3-port motor operated ball valves with no dead shut-off and 7.5 seconds operating time.

The type of three way valves and their operating times are determined in part by the desire to avoid so-called "water hammer" which occurs when a column of fluid is suddenly stopped. The maximum pressure produced by such sudden stoppage can be estimated by the Joukowsky equation:

$$h_{wh} = a(\Delta v)/g_c$$

where $$a = \left[ \frac{d}{g_c} \left( \frac{i}{k} + \frac{D}{bE} \right) \right]^{-0.5} \text{ where}$$

$h_{wh}$=water hammer head, feet of fluid;
a=velocity of wave propagation feet/second;
$\Delta v$=change in velocity of fluid, feet/second;
$g_c$=dimensional constant, 32.17 pound feet per pound force second$^2$;
d=fluid density, pounds/cubic foot (for water 62.33 pounds per cubic foot at 68° F.);
k=bulk modulus of elasticity of fluid, pounds force/ft$^2$ (for water 45.6×10$^6$ pounds force/ft$^2$);
D=pipe inside diameter, inches (1.939" for nominal Schedule 80 2" PVC pipe; 2.900" for nominal Schedule 80 3" PVC pipe);
b=pipe wall thickness, inches (0.218" for nominal Schedule 80 2" PVC pipe; 0.300" for nominal Schedule 80 3" PVC pipe);

E=modulus of elasticity of pipe wall material, pounds force/ft$^2$ (about 54×10$^6$ pounds force/ft$^2$ for PVC pipe).

Substituting in the values of the parameters for PVC pipe and water one obtains:

$$a = 4851 \left( 1 + 0.8445 \frac{D}{b} \right)^{-0.5}$$

i.e. for 2" Schedule 80 PVC pipe and water 1660 feet/second and for 3" Schedule 80 PVC pipe and water 1600 feet/second. The water hammer pressure in pounds per square inch is:

$P_{wh}$=0.01345 a($\Delta v$)

i.e. for $\Delta v$ of 10 feet per second $P_{wh}$=223 psi.

The maximum pressure can also be developed if the flow is changed within the time it takes the pressure wave to travel from the point of stoppage to the end of the pipe (or to the point of total wave reflection) and return, that is within one period given by:

$$t = \frac{2L}{a} \text{ where}$$

t is the pipe period in seconds, L the pipe length in feet and a the velocity of wave propagation in feet/second as estimated by Joukowsky's equation. For example if L is 10 feet, then for Schedule 80 nominal 2" PVC pipe and water, t is about 0.012 seconds. Water hammer may be avoided by using valves with a comparatively long operating time and/or valves which "make-before-break" i.e. make the new connection in part before breaking the old connection completely.

Additional information on water hammer and its control may be obtained for example from:

Parmakian, "Water Hammer Analysis", Prentice-Hall, Englewood Cliffs, N.J. 1955;

Wylie and Streeter, "Hydraulic Transients", McGraw-Hill, NY 1978;

Rich, "Hydraulic Transients", McGraw-Hill, NY 1951;

Angus, "Hydraulics for Engineers" 3d. Ed., Pitman, Toronto.

If the time of flow stoppage is somewhat longer than one pipe period, then the pressure rise will not be as great as that given by the Joukowsky equation since part of the direct pressure waves will be cancelled by reflected pressure waves. The actual pressure rise can be determined from the so-called Allievi equations or charts given in Angus and in Rich cited above. Wood and Jones, "Proc. Am. Soc. Civ. Eng., J. Hydraulic Div. 99 (HY1), 167–178 (1973) present charts for more reliable estimates of water hammer pressure for different valve closure modes.

Referring again to FIG. 3, although more than 1000 EDR plants have been installed around the world using such system it is obvious that such a plant entails a nest of three-way valves which with its associated activators, piping and controls is complex and expensive. Objects of this invention therefore include:

in EDR and EDIR plants (and in other plants in which connections are made from each of two or more inlet streams (at least two of which flow simultaneously) to one or more exit streams of a group of at least two) to reduce the number of diversion valves required;

in such plants to reduce the complexity and/or costs of the diversion valve system required;

for such plants, to provide improved diversion valve systems;

for such plants to provide a flow diversion apparatus which has at least one rotatable first body, a first surface of which is adjacent to a first surface of a second body, the first body providing at least first and second conduits, at least one end of each conduit terminating at the first surface of the first body, the second body also providing at least first and second fluid conduits, at least one end of each conduit terminating at the first surface of the second body, the first ends of each conduit in the first body and the first ends of each conduit in the second body being in such predetermined positions that the first conduit of the first body communicates with the first conduit of the second body and the second conduit of the first body communicates with the second conduit of the second body, such flow diversion apparatus designed so that when such first body is rotated by a predetermined angle then the first conduit of the first body communicates with the second conduit of the second body and the second conduit of the first body communicates with the first conduit of the second body;

to reduce the complexity and cost of piping associated with such flow diversion systems by mounting such systems on the EDR or EDIR stacks (or other apparatus for which such flows are being diverted);

to reduce the complexity and cost of piping associated with such multiple flow diversion systems by embedding such systems into the end plates or end blocks of an EDR or EDIR stack for which such flows are being diverted;

to reduce the complexity and cost of such multiple flow diversion systems by integrating such systems with the end plates and/or end blocks of an EDR or EDIR stack;

to provide such multiple flow diversion systems which do not exhibit water hammer during flow diversion.

These and other objects will become clear from the following description of the invention and the appended claims.

SUMMARY OF THE INVENTION

The invention provides multi-stream flow diversion apparatus for connecting at will or in a predetermined manner two or more inlet streams, at least two of which flow at the same time, to one or more exit streams of a group of at least two. The flow diversion apparatus has at least one rotatable first body, a first surface of which is adjacent to a first surface of a second body. The first body provides at least first and second fluid conduits, at least one end of each conduit terminating at the first surface of such first body. The second body also provides at least first and second fluid conduits, at least one end of each conduit terminating at the first surface of the second body. The first ends of each conduit provided by the first body and the first ends of each conduit provided by the second body are in predetermined positions enabling the first conduit of the first body to communicate with the first conduit of the second body and the second conduit of the first body to communicate with the second conduit of the second body. Means are provided to rotate such first body by a predetermined angle thereby enabling the first conduit of the first body to communicate with the second conduit of the second body and the second conduit of the first body to communicate with the first conduit of the second body. The invention also provides such multi-stream flow diversion devices which are designed and/or operated to avoid water hammer. The invention further provides such multi-stream flow diversion devices which are integrated into the end plates and/or end blocks of EDR or EDIR stacks or integrated into other apparatus for which the diversion device provides selectable multi-stream flow.

BRIEF DESCRIPTION OF THE DRAWINGS

FIGS. 6$a$–$c$ are highly schematic representation of a third preferred embodiment of this invention, presented in part to illustrate the flexibility of the invention;

FIGS. 7$a$–$b$ are highly schematic representation of a preferred means for joining together the main components of some preferred embodiments of this invention;

FIGS. 8$a$–$c$ are highly schematic representation of a fourth preferred embodiment of this invention, also presented in part to illustrate possible ramifications of the invention;

FIGS. 10$a$–$f$ are highly schematic representation of some preferred fluid flow conduits which may be provided by the rotatable first bodies of preferred embodiments of this invention.

DESCRIPTION OF PREFERRED EMBODIMENTS

One preferred embodiment of this invention is shown schematically in FIG. 4. In FIGS. 4($a$),($b$),($c$) and ($d$), 50 indicates a block of any suitable material which can resist the temperature, mechanical stresses and the corrosion and erosion from the fluids handled, including metals such as carbon steel, stainless steels, nickel, Monels, aluminum, brasses, bronzes and titanium; thermoplastics such as rigid polyvinyl chloride, ethylene polymers and copolymers, polyesters, vinylidene chloride polymers and copolymers (Saran), styrene polymers and copolymers, propylene polymers and copolymers, tetrafluoroethylene polymers and copolymers, acrylonitrilebutadiene-styrene (ABS) terpolymers, high impact polystyrene, polycarbonates, chlorotrifluoroethylene polymers and copolymers (e.g. Kel-F), vinylidene fluoride polymers and copolymers, nylons and polyimides, polyacetals, cellulose acetate-butyrate and polysulfone; thermosetting polymers such as polydicyclopentadiene polymers and copolymers, polyesters (including bisphenol polyesters), epoxy, furan, phenolic, urea or melamine polymers; ceramics such as porcelain; glass; graphite or carbon. Composite materials may be used such as cermets or any of the above polymers reinforced with fibers, fabrics or powders such as glass fibers, mineral fibers, silica gel or powders, carbon black. Other composite materials include porcelain or plastic coated steel. In FIG. 4(a), which is a plan view, 51 is a circular cavity in such block 50. 52a and 52b are conduits extending from one surface of the block to such cavity 51. Such conduits need not have the same shape or cross-sectional area and need not be straight through block 50. The conduits may be of such diameter as to accept standard pipe sizes which pipes are solvent or thermally welded to such block or otherwise communicate with the block, for example being affixed with flanges or threads. 54 are suitable holes for tie rods or bolts. The block of FIG. 4(a) is symmetrical from the top to the bottom of the figure and from the left to the right of the figure, i.e. the bottom of the figure is a mirror image of the top and the right hand side is a mirror image of the left. For this embodiment of the invention, the multi-stream flow diversion device requires two pieces, which may be of the same or different materials, constructed essentially as shown in FIG. 4(a). The second piece is turned over and placed on top of the first piece so that the cavity 51 of each piece coincides with the cavity 51 of the other piece. The pieces are rotated 90° (or 270°) with respect to each other so that the conduits 52a and 52b of the second piece are over positions 53a and 53b shown in dashed lines in FIG. 4(a).

Figure 4A:
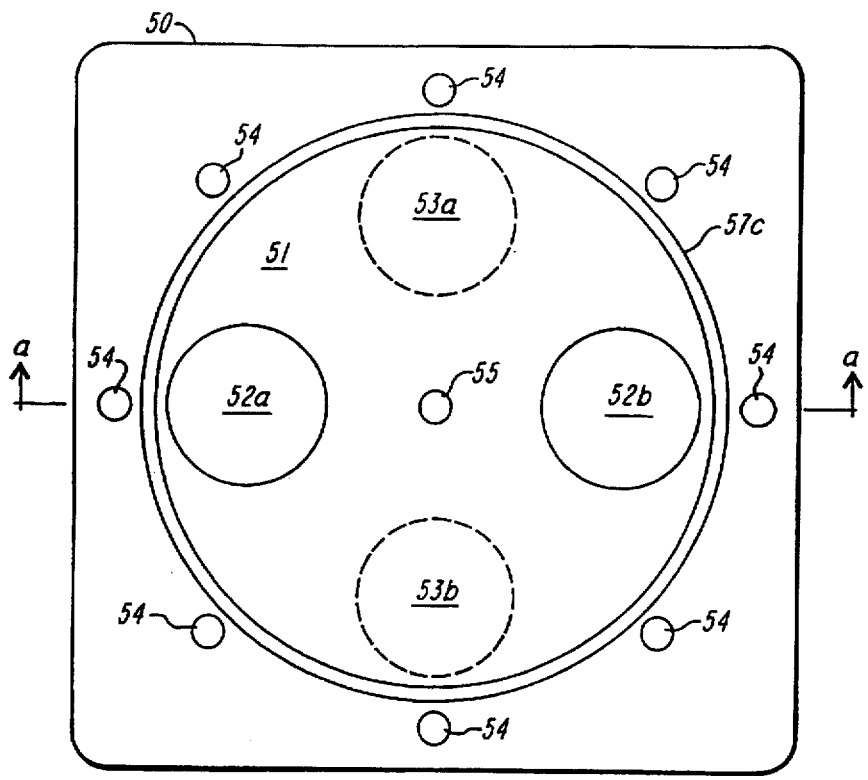
FIGS. 4$a$–$f$ are schematic representation in various cross-sections of one preferred embodiment of the multi-stream flow diversion apparatus of this invention.
Figure 4B:
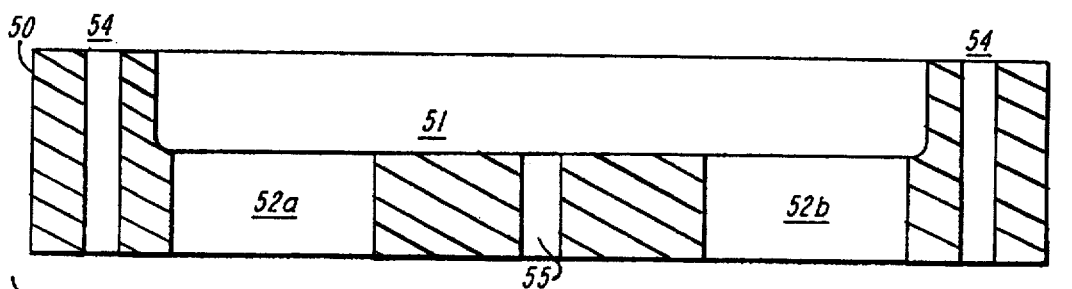
Figure 4C:
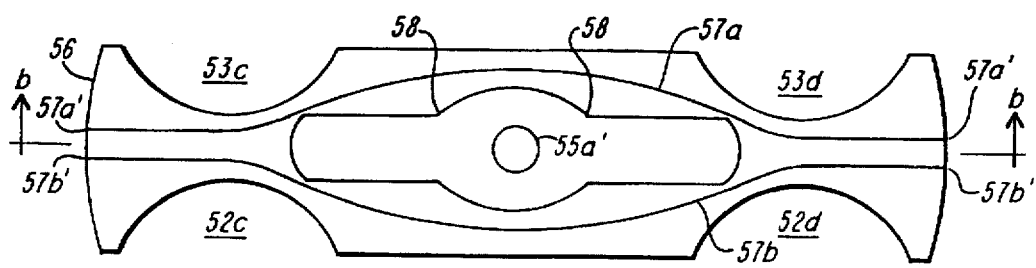
Figure 4D:
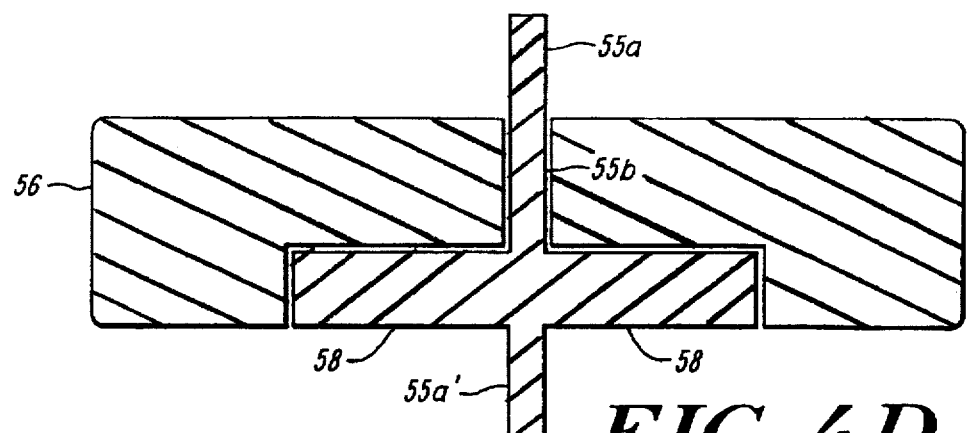
Figure 4E:
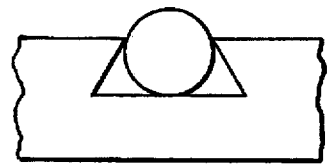
Figure 4F:
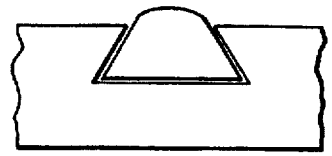

FIG. 4(b) corresponds to section a—a of FIG. 4(a). FIG. 4(c) is a plan view of a rotable body which provides first and second fluid conduits, in this instance designed for make-before-break operation and useful with quick-acting actuation. FIG. 4(c) may be understood in conjunction with FIG. 4(d), a section of FIG. 4(c) along b—b. 56 is a block of a suitable material which may or may not be the same as that used in FIG. 4(a). For example, the block may consist of stainless steel coated with a suitable polymer or elastomer at least on those surfaces which are juxtaposed to blocks 50. The block has cut-outs 52c,52d, and 53c and 53d shown as arcs of circles. Such cut-outs may have any suitable shape e.g. that of triangles, wedges, rectangles or other polygons; arcs of parabolas or ellipses or other regular or irregular contours. The cut-outs need not have the same depth or shape at both faces of block 56 and the cut-outs need not be the same in depth or profile. 55a–55a' is a drive shaft adapted to rotate rotor 56. Such drive shaft may be attached to or be an integral part of driving arms 58 or rotor 56. Such arms may have any suitable length or cross-section, e.g. square, rectangular, trapezoidal and may have different shapes and cross-sectional areas at the ends as compared to the shape and cross-sectional area at or near drive shaft 55a–55a'. Driving arms 58 are shown at one face of block 56 but they may be imbedded within the block during the manufacture of such block, e.g. the block may be cast or polymerized around said arms, in such case preferably also around drive shaft 55a–55a'. The block may be fabricated from two or more pieces screwed, nailed, bolted, welded or otherwise attached together, one or more of the pieces containing suitable cavities for the arms. Drive shaft 55a–55a' fits tightly or loosely into aperture 55b of block 56 and apertures 55 of the two blocks 50 forming the exterior of the multi-stream flow diversion device as set forth above. 57a and 57b are O-rings in suitable grooves extending around both faces of rotor 56 as shown at 57a' and 57b'. A single O-ring may be used. 57c is a suitable groove for an O-ring gasket serving to seal the two pieces 50 together (as set forth above) to inhibit leakage or weepage of fluid from the cavities 51 to the outside of the device. The gaskets 57a and 57b may be impregnated with a lubricant or be self-lubricating. The gaskets 57a, 57b and 57c may for example have round or oval cross sections (i.e. an O-ring cross-section) or have any other suitable cross-section e.g. delta, inverted "V", lambda or trapezoidal as shown in FIGS. 4(e) and 4(f). The gaskets may or may not be bonded (e.g. with adhesive) in a suitable groove. The gaskets may be mechanically bound in a groove having inwardly sloping sides as also illustrated in FIGS. 4(e) and 4(f). The more the O-ring is compressed, the more tightly will it be held in the groove. Advantageously the O-rings are of polytetrafluoroethylene or perfluoroethylene-propylene copolymer although other materials may be used. The O-ring material may be filled, e.g. glass filled. the gaskets 57a and 57b may have the profiles of the wipers used in contact-type wiped film evaporators.

The multi-stream flow diversion device of FIG. 4 may be assembled by placing rotor 56 into cavity 51 of block 50, drive shaft 55a' of rotor 56 fitting into aperture 55 of block 50. A second block having the configuration of FIG. 4(a) is placed over rotor 56, the cavity 51 of such second block 50 fitting over rotor 56 and drive shaft 55a fitting into aperture 55 of such second block 50. The latter is rotated until its conduits 52a and 52b are over the positions 53a and 53b of FIG. 4(c). The blocks 50 are then compressed together e.g. with nuts and bolts and/or tie-rods through registering apertures 54. It will be seen that when the arms of rotor 56 extend from 1:30 o'clock to 7:30 o'clock (referring to FIG. 4(a)) then aperture 52b in the first block 50 will communicate with that aperture in the second block which aperture is positioned over position 53b. Similarly rotor 56 will provide a conduit from conduit 52a to that aperture in the second block which aperture is positioned over position 53a. If rotor 56 is then rotated 90° in either direction it will extend from 4:30 o'clock to 10:30 o'clock (again referring to FIG. 4(a)). Rotor 56 will then provide a first conduit from aperture 52b to that aperture in the second block 50 which aperture is positioned over position 53a and a second conduit from aperture 52a to that aperture in such second block which aperture is positioned over position 53b.

Although apertures 52a and 52b are indicated as being in the first block and apertures "53a" and "53b" in the second block, 0 to 4 of such apertures may be in the first block and 4 to 0 of such apertures in the second block.

By way of example, for flows of about 200 U.S. gallons per minute ("GPM") of water in each of conduits 52a and 52b of FIG. 4(a) and using Schedule 80 rigid PVC pipe the dimensions of the device of FIGS. 4(a),4(b),4(c) and 4(d) may be:

dimensions of block 50 of FIG. 4(a): 16"×16"×3";

diameter of cavity 51: 12 9/16";

depth of cavity 51: 1 17/32";

diameter of apertures 52a and 52b: 3½";

length of center line between apertures 52a and 52b: 8½";

diameter of bolt circle (diameter of circle passing through centers of apertures 54): 14";

length of rotor 56: 12½";

maximum width of rotor 56: 3";

depth of rotor 56: 3";

diameter of drive shaft 55a–55a': ⅝";

cross-sectional diameter of O-rings 57a, 57b and 57c: 3/16".

The blocks 50 and 56 may be rigid PVC; the drive shaft and driving arms may be type 316 stainless steel; and the O-rings glass filled polytetrafluoroethylene.

In FIG. 4(a) the block 50 is indicated as essentially square. Obviously it may also be circular having a diameter somewhat larger than the diameter of the circle passing through the centers of apertures 54. For example if the latter circle is 14" then block 50 may have a dimater of 16". Alternatively block 50 may have any desired peripheral shape which does not substantially reduce the mechanical strength of the resulting multi-stream diversion device and which permits two such blocks to be fastened together. The two blocks 50 need not have the same external dimensions or peripheral shape. Further the blocks need not be identical. For example, in connection with FIGS. 4(a) and 4(b), each block 50 had an identical cavity which together provided the space to accomodate rotor 56. Obviously the needed cavity may be unequally divided between the blocks including the possibility that the entire cavity is in one block, the other block then serving essentially as a cover plate. As noted above the apertures which serve as entrance and exit fluid conduits may be apportioned in any desired way between the blocks 50 regardless of which one contains the cavity to accomodate rotor 56. It will also be obvious that the cavity may be formed from a right section of a cylinder closed at each end by flat plates, one or both of the latter containing the apertures 52a, 52b, "53a" and "53b". The tie bolts or tie rods may pass through the walls of the cylinder parallel to the axis of such cylinder or outside such walls. The cylinder may be glued or welded (including solvent welding) to one or both of the end plates and/or may fit into a groove having any desired cross-section in such end plate. The structure of FIG. 4(a) may be fabricated from such a right section of a cylinder and a flat end plate. However fabricated, the cavity 51 may contain rounded shoulders on which the O-rings or wipers at 57a' and 57b' may ride. Similarly the rotor 56 may be rounded at 57a' and 57b' to remove strain from the O-rings or wipers and to provide better sealing against piece 50.

It is also obvious that using rotor 56 and a cavity provided by a single cylinder or a single piece 50 (with a cover plate) some or all of apertures 52a,52b,"53a" and "53b" may be moved to the wall of the cylinder.

The gauge pressure of the fluids in the multi-stream flow diversion device of FIGS. 4(a) and 4(c) tends to force the two blocks 50 away from each other. Hence to prevent external leakage and weeping and internal cross-leaking and cross-weeping the blocks 50 must be constrained together, the closing force being more or less proportional to the fluid gauge pressures. Conveniently this may be accomplished as noted above by tie-rods and/or nuts and bolts. Between the nuts and/or the bolt heads and the blocks 50 may be washers, lock washers, Belleville washers and/or springs, the latter items helping to maintain sealing pressure in the event of differing thermal coefficients of expansion of the materials of blocks 50 and the materials of the tie rods and/or bolts. Metal rings may be placed over the circle of apertures 54 to help distribute the sealing pressure in the event the gauge pressure of the fluids handled is high, such ring having apertures registering with apertures 54. Other force distributing expedients well-known in the art may also be used. For example a spider may be used, each leg of the spider ending in a hole registering with the apertures 54. The spider may have a central aperture through which drive shaft 55a or 55a' passes. The spider should be designed to distribute closing pressure uniformly over the surface of block 50. Alternatively block 50 may have radial ribs (buttresses) extending some distance from the apertures 54 generally in the direction of the center block 50.

The rotor 56 of the multi-stream flow diversion device of this invention may be rotated in various ways. FIGS. 4(a), 4(b),4(c) and 4(d) show a drive shaft 55a–55a' passing through blocks 50 and attached to the center of rotor 56. The drive shaft may be rotated by hand, for example with a lever, levers or a wheel attached to an external portion of the drive shaft. In this case block 50 may have suitable markings to indicate the correct positions of the lever, levers or wheel and/or may have stops or detents to limit or restrain movement of the rotor. The stops or detents may be within the cavity 51 particularly if the rotor moves back and forth between the 10:30 and 1:30 positions.

The drive shaft may also be positioned by means of various actuators well-known in the art, for example, by a rack-and-pinion type pneumatically, hydraulically or electrically driven rotary actuator. Such actuators may be slow- or quick-acting. If the actuator is slow-acting, the multi-stream flow diversion device of this invention may be either make-before-break or break-before-make; if quick acting, make-before-break operation is preferred to minimize water hammer. If the drive shaft terminates in a wheel having gear teeth along an appropriate sector then such wheel can be actuated by a worm gear or a pinion gear driven by an electric, pneumatic or hydraulic motor. The geared wheel may be driven by a chain or toothed belt which in turn is driven by a sprocket or a pinion gear, in turn driven by one of the above mentioned motors. The drive-shaft may be coupled in-line with such a motor having high starting torque characteristics (for example 100 inch-pounds) e.g. a planetary geared motor. Two or more multi-stream flow diversion devices may be ganged together with one or more activators.

Figure 1:
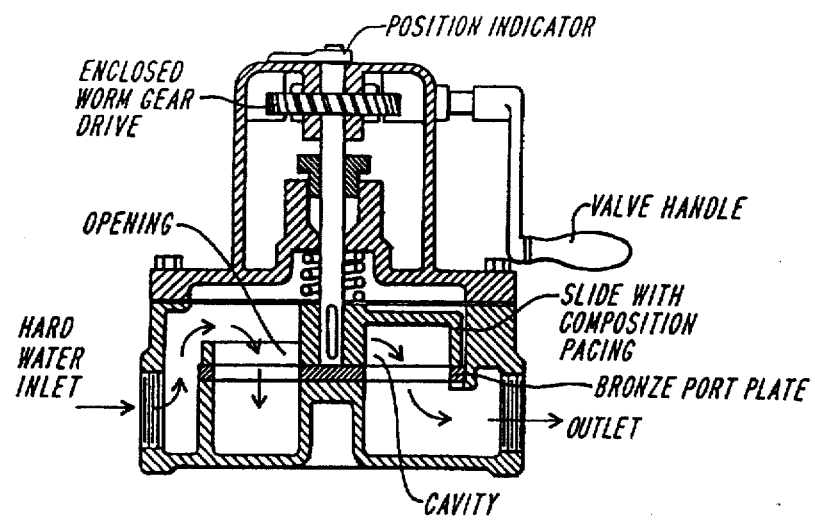
FIG. 1 is a schematic representation in cross-section of a manually operated valve known in the art for diverting a single inlet stream selectably to one of a group of several outlet ports.
Figure 2:
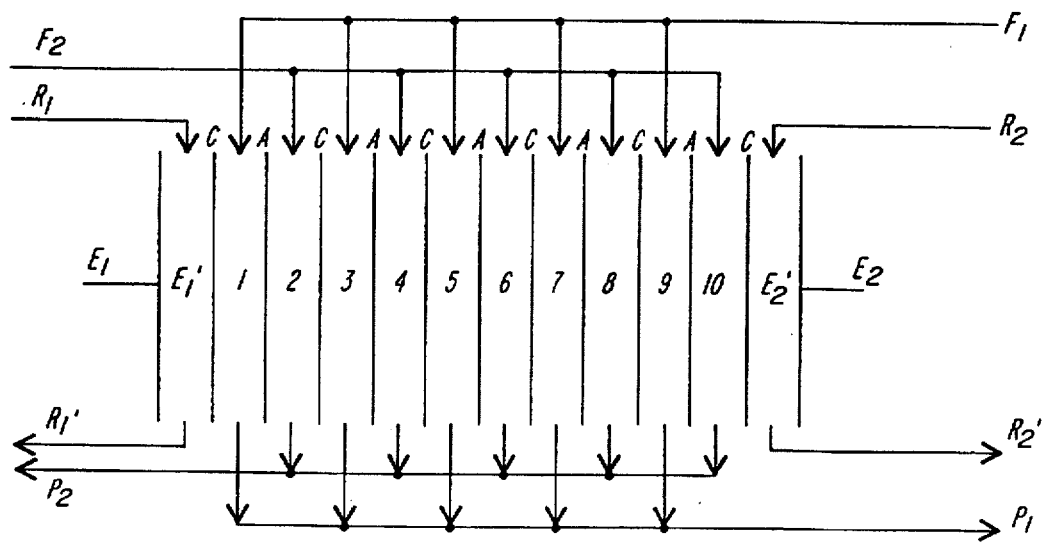
FIG. 2 is a schematic representation in cross-section of a stack or pack for carrying out reversing type electrodialysis ("EDR") including filled cell electrodialysis also called electrodeionization ("EDIR"), known in the art.
Figure 3:
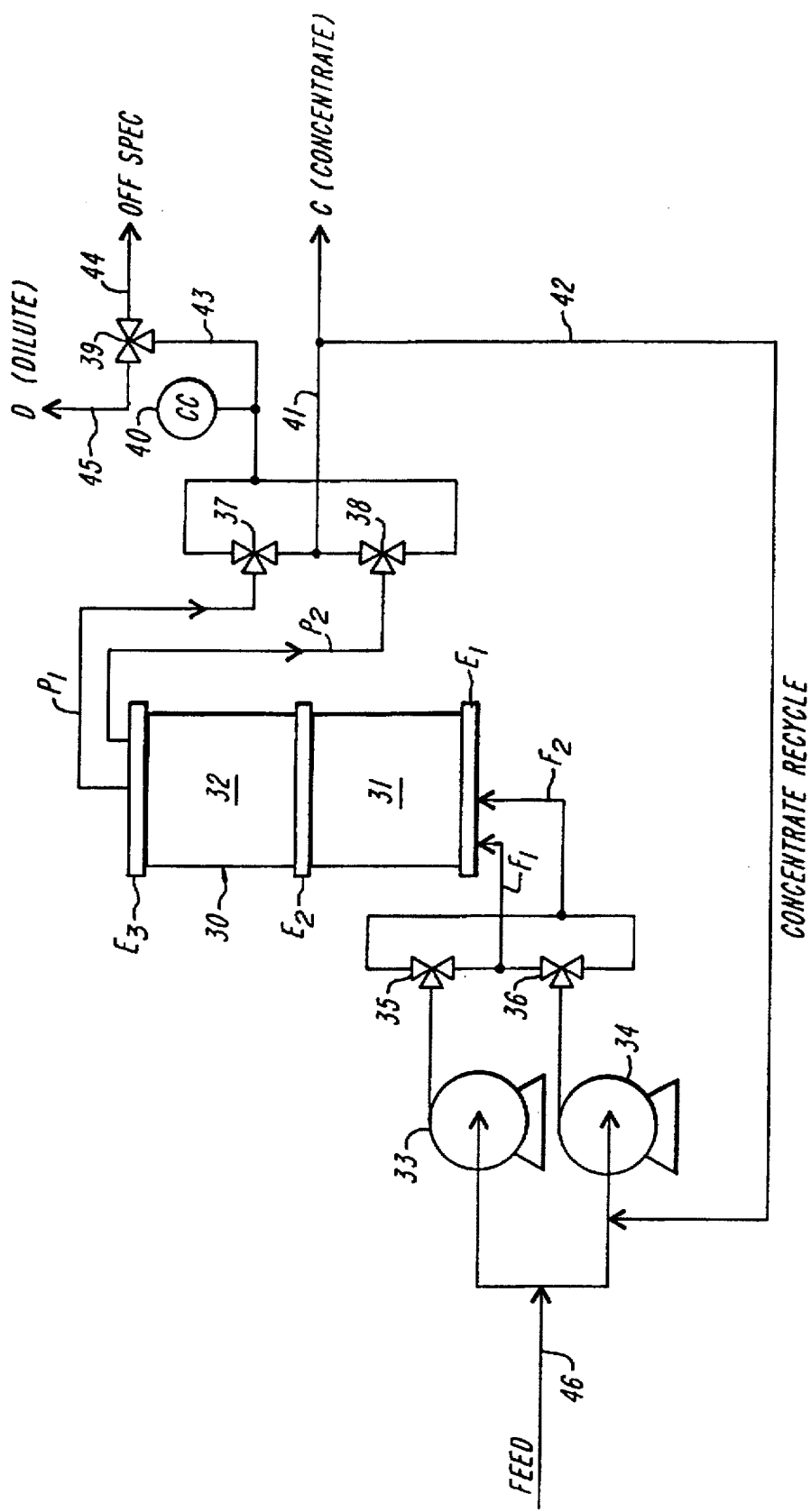
FIG. 3 is a schematic representation of a process flow sheet for carrying out EDR and/or EDIR illustrating the nest of three-way valves commonly used in the art.
Figure 5:
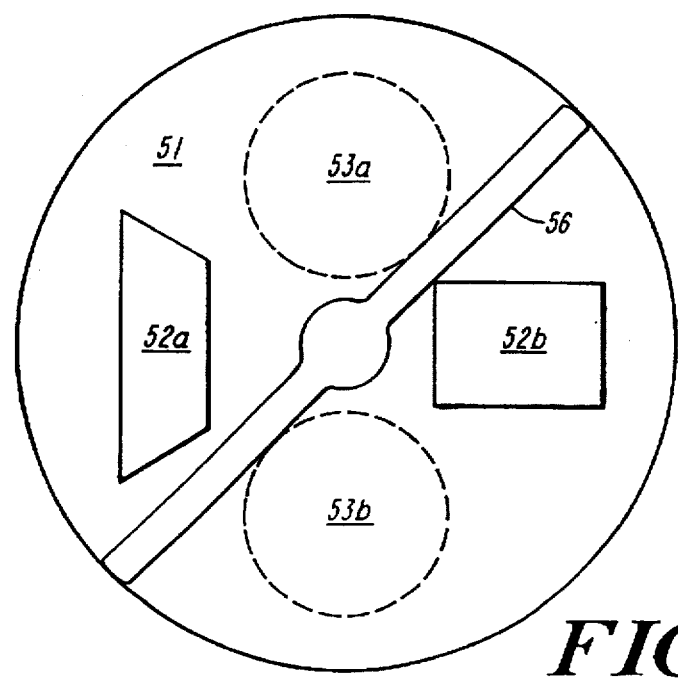
FIG. 5 is a schematic representation of another preferred embodiment of this invention, the multi-stream flow diversion device adapted to be integrated with an EDR or EDIR stack.

Referring to FIGS. 3 and 4, a multi-stream flow diversion device of FIG. 4 obviously may replace three-way valves 35 and 36 on the one hand and a second such device may replace three-way valves 37 and 38. Referring to FIG. 5, a popular EDR stack has inlet manifold openings in the stack end blocks as shown by 52a and 52b. The areas of 52a and 52b are each about 0.02 square feet, i.e. corresponding to Schedule 80 nominal pipe size 2". The distance between the centers of 52a and 52b is about 4". There are a mirror image pair of outlet manifolds at the other long edge of the same stack end block, the center line distance between 52b and its mirror image manifold hole being about 7.2". Such an EDR stack has stack end blocks at each end of the stack and when the stack consists of several hundred membranes then hydraulic connections may be made to the stack through both stack end blocks.

In FIG. 5, 51 represents the cavity in the multi-stream flow diversion device which may be formed from a right section of a cylinder having an inside diameter of about 7¹¹⁄₃₂" and affixed to the end block of the EDR stack. The cylinder section may be rigid plastic or plastic- or rubber-lined steel. A cap plate may be fitted over the cylinder, such cap plate having conduits for Schedule 80 nominal 2" pipe, such conduits lying over the dotted circles 53a and 53b indicated in FIG. 5. The cap plate may be integral with the cylindrical section. 56 indicates a rotor providing in the position shown, a first fluid conduit from 52b to 53b and a second fluid conduit from 52a to 53a. When the stack is in reverse operation, rotor 56 may be rotated in either direction 90° whereupon it provides a first conduit from 52b to 53a and a second conduit from 52a to 53b.

An EDR plant may consist of 2 or more EDR stacks in series, each stack having several hundred membranes. In such case, the first stack in the series may have one multi-stream inlet flow diversion device, such as that schematically illustrated in FIG. 5, in one end block and a second, similar multi-stream inlet flow diversion device in the opposite end block. The last stack in such series may have one multi-stream outlet flow diversion device, such as that illustrated in FIG. 5, in one end block and a second such device in the opposite end block. Flows between stacks in the series are made by direct connections between the dilute outlet of one stack and the dilute inlet of the next stack and also between the concentrate outlet of such one stack and the concentrate inlet of such next stack.

The cap plate mentioned above with reference to FIG. 5 may, if desired, be integral with the cylinder section as mentioned above and may be bolted to the end plate which compresses the end blocks against the EDR stack.

Multi-stream flow diversion devices according to this invention may also be integrated with the end blocks of EDIR stacks.

The manifold openings 52a and 52b in the EDR-EDIR stack end block illustrated in FIG. 5 are resp. trapezoidal and rectangular, registering with similarly shaped openings in the membranes and intermembrane gaskets of the EDR or EDIR stack, thereby forming internal fluid flow manifolds. Such openings 52a and 52b may obviously be circular on the outside surface of such end block, changing in cross-section through the thickness of the end block to such trapezoidal and rectangular profiles.

Many other multi-stream flow diversion apparatuses are possible within the scope of this invention, differing only in detail from the devices disclosed in connection with FIGS. 4 and 5. For example, in FIG. 6, (a) represents a plate having apertures 2,4,6,8,10,12,14 and 16 to which apertures conduits may be attached, for purposes of this example, to the apertures below the plane of the figure. Plate (a) will generally therefore be fixed in position, for example, affixed to an end-plate or end-block of an EDR or EDIR stack. In FIG. 6, (c) represents a second plate having apertures 1,3,5,7,9,11,13 and 15 to which apertures conduits may also be attached, for purposes of this example, to the apertures above the plane of the figure. Plate (a) will also therefore generally be fixed in space. A multi-port, multi-stream flow diversion apparatus may then be assembled, for example, by placing part (b) of FIG. 6 on top of part (a) and part (c) on top of part (b). In part (b), A,B,C,D,E,F, G and H are oblong generally curved conduits. Part (b) is rotatable between parts (a) and (c).

In the orientation shown:

conduit means A connects (provides a conduit between) apertures 1 and 2;

conduit means B connects (forms a conduit with) apertures 3 and 4;

conduit means C connects (forms a conduit between) apertures 5 and 6;

conduit means D connects apertures 7 and 8; and conduit means E connects apertures 9 and 10.

The connections provided by conduit means F,G and H will be obvious from an inspection of the figure.

If part (b) of FIG. 6 is rotated clockwise 45° then it is obvious that conduit means A will connect apertures 2 and 3 and the other lettered conduit means will similarly step to a different pair of numbered apertures. Further, if part (b) is instead rotated counterclockwise 45° then it is obvious that conduit means A will connect apertures 1 and 8 (instead of 1 and 2 or 2 and 3) and the other lettered conduit means will similarly step to a different pair of numbered apertures.

The apparatus of FIG. 6 permits the interchange of 8 simultaneously flowing fluid streams, for example with respect to an EDR or EDIR stack or an array thereof, dilute influent and effluent, concentrate influent and effluent; anode influent and effluent; and cathode influent and effluent. If the device of FIG. 6 is mounted on the end-plate and/or end-block of such stack then conduits tunnels) within such end-block may connect apertures 1 through 8 with the appropriate internal manifolds in such stack. It will be obvious that fluid communication with that electrode which is at the opposite end of such stack can also be made by means of an internal manifold, alternately by means of an external conduit, e.g. tubing.

Although outer stator plates each having eight apertures are disclosed above and an inner rotatable rotor plate providing eight fluid conduits, it will be obvious to those skilled in the art that many other combinations are possible within the scope of this invention, the details of the combinations dependent upon the details of the intended application of the device.

Parts (a), (b) and (c) of FIG. 6 may be fabricated from any of the various materials set forth above in connection with FIG. 4. The central disc must rotate between the outer plates and is in general closely juxtaposed or in contact with the latter. In such case the central disc and the outer plates should not bind or gall. The central disc (and/or the outer plates) may have intrinsic lubricating properties and may be, for example, nylon, graphite, soapstone or polytetrafluoroethylene. A graphite central rotor may be used, for example, with steel or stainless steel outer plates. The rotor may be composite, e.g. aluminum or stainless steel coated with polytetrafluoroethylene. Carbon may be used against glass, ceramics, porcelain or porcelainized steel. Ceramics may generally be used against ceramics. The mating surfaces between the central and outer discs may be coated with lubricant such as silicone oil or wax, molybdenum disulfide, polytetrafluoroethylene, perfluoroethylenepropylene copolymer (FEP) soapstone and graphite. Metal mating surfaces may be tin plated (e.g. with tin babbit or tin bronze) to reduce friction between the rotating and stationary parts.

The following table illustrates the coefficients of static and sliding friction for some selected mating materials.

|  | Static | | Sliding | |
| --- | --- | --- | --- | --- |
|  | Dry | Greasy | Dry | Greasy |
| Hard steel on hard steel | 0.78 | 0.11 | 0.42 | 0.029 |
| Hard steel on graphite | 0.21 | 0.09 | — | — |
| Mild steel on mild steel | 0.74 | — | 0.57 | — |
| Aluminum on aluminum | 1.05 | — | 1.4 | — |
| Bronze on cast iron | — | — | 0.22 | 0.077 |
| Brass on mild steel | 0.51 | — | 0.44 | — |
| Tin on cast iron | — | — | 0.32 | — |
| Carbon on glass | — | — | 0.18 | — |
| Cast iron on cast iron | 1.10 | — | 0.15 | — |

The coefficient of friction is defined as the ratio of the frictional force to the force pressing together two flat bodies in contact. Obviously the selection of mating surfaces can make a substantial difference in the starting and continuing torque which must be applied to the central rotor.

Leakage or weeping of fluid from the valves of this invention to the outside may be undesirable. Cross-leaking or weeping between the fluid streams handled may also be undesirable. If the mating surfaces precisely mate or match and if they are non-galling, lubricated or self-lubricating then external or cross-weeping may be negligible for practical purposes. Alternatively the apertures in the outer plates (stators) and/or conduit means in the central plate (rotor) may be surrounded by gaskets, advantageously bonded to or integral with the plates. The gaskets may be impregnated with a lubricant or be self-lubricating.

As noted above in connection with FIG. 4, the pressure of the fluids passing through the multi-stream flow diversion valves of this invention tends to force the blocks or plates away from each other. Therefore to inhibit external leakage and weeping and internal cross-leaking and cross-weeping the plates or blocks must be constrained together, the closing force being more or less proportional to the fluid gauge pressure. Conveniently this may be accomplished if the outer diameter of the outer stationary discs (stators) is substantially greater than that of the inner, rotable disc (rotor) as illustrated in FIG. 7.

In FIG. 7 "p" represents pipe connections to two apertures in plate "a", "t" are tie rods, "n" nuts compressing plates "a" and "c" against rotatable disc "b" and "s" are stand-offs, short pieces of pipe carefully cut to prevent over-compression and distortion of plates "a" and "c". (The pieces "s" may be replaced by a right section of a cylinder having appropriate holes for the tie rods "t". Such cylindrical section can serve as well other purposes: it can contain leakage or weepage to the outside, optionally with a weep hole to conduct away any such weepage or leakage; it can be air or water pressurized (e.g. by the weepage itself) thereby reducing the tendency of the interface between the inner and outer discs to weep; it can be in contact with inner disc "b" thereby permitting other fluid connections through the side of the cylindrical section through the circumference of rotatable disc "b"; the cylindrical section can, together with the outer plates, form a cavity in which a rotatable flow diversion component rotates as discussed in connection with FIG. 4).

Between nuts "n" and plates "a" and/or "c" may be washers, lock washers, Belleville washers and/or springs. The tie rods and nuts may be replaced with nuts and bolts. FIG. 7(b) illustrates a metal ring which may be placed over plate "a" to help distribute the sealing pressure in the event the gauge pressure of the fluids handled by the valve is high. "h" are holes in ring "r" registering with similar holes in plates "a" and "c". A second metal ring may be similarly located under plate "c". In FIG. 7(b) tie-rods and nuts (or nuts and bolts) are not shown. In both FIGS. 7(a) and 7(b) "d" is a drive-shaft passing through plate "a" and attached to plate "b" for rotating plate "b" with respect to plates "a" and "c" as discussed above. In the event of high fluid pressures and high torque on nuts "n" (to compress plates "a" and "c" against plate "b") then there may be substantial distortion of plates "a" and "c" leading inter alia to crossleaks between the apertures in the plates. Such distortion may be resisted, for example, by increasing the thickness of plates "a" and "c", decreasing the inner diameter of ring "r" even to zero (nevertheless providing apertures in ring "r" for pipes "p" and drive shaft "d"). Other expedients well known in the art may be used. For example, in the interest of saving weight, ring "r" may be replaced by a spider or by buttresses (radical ribs) as set forth in connection with FIG. 4.

The central plate of the valves of FIGS. 6 and 7 may be rotated in various ways. FIG. 7, for example, shows a drive-shaft "d" passing through an outer plate of the valve and attached to the center of the central plate. Positive coupling between the drive shaft and the central piece may be arranged in various ways. For example, the end of the drive shaft within the central plate (rotor) may contain a hole of any convenient shape (e.g. circular, square, hexagonal, triangular) through which a pin passes, such pin having a cross-section registering with the hole in the drive shaft, the pin having a length which is substantially greater than the diameter of the drive shaft. Alternatively the drive shaft may pass through a suitably shaped hole in the pin. The pin may fit snugly in a hole passing through the central plate at a right angle to the drive shaft. The drive-shaft may instead, by way of another example, end in a spider integral with, welded to or otherwise fastened to the drive shaft, the end of the drive-shaft with the spider being imbedded in the central plate during the manufacture of the latter. For example, the central plate may be cast around the spider or the central plate may be fabricated from two or more discs, at least one of the discs having grooves to accomodate the less of the spider. Either or both surfaces of the central plate may contain one or more grooves perpendicular to the drive-shaft, such grooves accomodating bars (of any convenient cross-sectional profile) attached to the drive-shaft. In the case of some materials of construction, it may be mechanically sufficient to weld the drive-shaft to the central piece, i.e. such weld may be sufficient to withstand the torque of rotating the central piece. The central plate and drive-shaft may be cast in a monolithic piece or machined from a suitable mass of material.

As noted in connection with FIG. 4, the drive-shaft "d" may be rotated by hand, for example with a lever, levers or a wheel attached to the external part of the drive-shaft or may be positioned by means of various activators. The central disc of FIGS. 6 or 7 may alternatively be driven through its periphery by means of most of the actuators discussed in connection with FIG. 4. For example, a lever may be attached through the periphery of the disc; the disc may be driven by a flat, Vee or geared belt or a chain, the periphery of the disc being respectively smooth, grooved or toothed; the disc may be toothed on at least part of its periphery and driven by a rack gear, a pinion gear or a worm gear. In any of these cases the clamping means must be arranged not to interfere with the driving means.

The discussion of actuators herein is not meant to be limiting, exhaustive or all inclusive. Useful actuators or positioners (including stepping or multi-step actuators or positioners) are well know in the art and may be easily adapted to the multi-stream flow diversion apparatuses of this invention.

The multi-stream flow diversion valve of this invention has been discussed above as an on/off device, capable of switching several streams. It may also stop the flow of all or some of the streams. (For example, if the rotatable disc of FIG. 6(b) is rotated 22.5° to the right or left then conduits A,B, C and D will not provide conduits between any pairs of numbered apertures). The flow diversion devices of this invention may be used also to control the rate of flow of fluid streams. For example, referring to FIG. 6, if the central disc is rotated a few degrees counter-clockwise, then referring for instance to conduit means "A", the right hand edge of such conduit means will throttle the flow through aperture 2 of FIG. 6(a) while not obstructing the flow through aperture 1 of FIG. 6(c). (As FIG. 6 is drawn, the flows through all the other apertures in FIG. 6(a) will be similarly throttled by the respective lettered conduit means). It will be clear that the lengths of any of the conduit means can be extended sufficiently so that they will not throttle the flows they conduct at small displacements of the central plate while simultaneously other conduit means do throttle the flows they conduct. Similarly the shapes of any of the numbered apertures may be chosen to enhance or diminish throttling by small displacements of the rotor. If it is desired to control flows by small displacments of the central disc, then the appropriate conduit means and/or apertures may have shapes facilitating such control. For example, aperture "10" of FIG. 6(a) may have a triangular cross-section, one apex of such triangle pointing counterclockwise and/or conduit means "E" of FIG. 6(b) may have a triangular clockwise end, instead of the rounded end shown, the apex of the triangle pointing clockwise.

In the discussion of FIGS. 4,6 and 7, the rotors have had flat parallel surfaces and the stationary blocks, plates or discs at least one flat surface which is juxtaposed substantially everywhere to a flat surface of the rotor. More generally, it is only necessary that the surface of the stationary pieces register substantially everywhere with the juxtaposed surface of the rotor throughout whatever angle the rotor moves during the switching cycles. For example, if the rotor 56 of FIG. 4 moves only 90° back and forth between positions at 10:30 o'clock and 1:30 then such rotor need register with the blocks 50 at the arcs from 10:30 to 1:30 and from 4:30 to 7:30. The registration need not be the same at such two blocks or at the two opposed arms of the rotor. Therefore in any movement arc the two registering surfaces may be any surface of rotation of a line extending from the mid-point of the surfaces of the rotor and the adjacent stator to edges of such components. If such line is a straight line (i.e. radius) then the relevant segments of the surfaces of the rotor and stator will be flat; if such line is curved (including multiply curved) in a direction parallel to the axes of the rotor and stator then the relevant surface segments will be curved surfaces of rotation such as surfaces of rotation of segments of circles, ellipses, parabolas etc., in each case an axis of the curved surface coinciding with the axis of rotation of the rotor.

It will be obvious that if the surface of the rotor is concave then, since that surface must be juxtaposed substantially everywhere to the surface of the adjacent stator, the latter surface must be convex throughout the arc of relative movement. It is not necessary that the two surfaces of the rotor have the same curvature; one can be, for example, a concave section of an oblate spheroid and the other a convex section of a prolate spheroid. The relevant surface segments can in fact have any profile as long as they are surfaces of rotation and the surface of the adjacent stator is the negative of the surface of the rotatable disc. For example, the surface can have one or more circular ridges or valleys of any desired cross-sectional shape. Such ridges and/or valleys may assist in positioning the stator and rotor and reduce bending moments on any central driveshaft of the rotor.

FIG. 8 illustrates schematically an additional preferred embodiment of this invention. It is assumed for purposes of the illustration that piece (b) is placed on top of piece (c) and (a) on top of (b). Once assembled in such fashion, the valve may be oriented in any direction. In FIGS. 8(a) and 8(b) the circles enclosed by solid lines represent apertures extending through the stators (a) and (b) for connections to pipes or tubing whereas the curved, oblong figures enclosed by dotted lines represent conduit means embossed on the sides of the stators adjacent to the rotor (b). In the orientation shown, the connections are: 19 to 21; 20 to 22; 17 to 23; and 18 to 24. If the rotor is rotated 45° either clockwise or counter-clockwise the connections are: 19 to 24; 20 to 21; 17 to 22; and 18 to 23.

FIG. 9 illustrates schematically another preferred embodiment of this invention, capable of combining in a single multi-stream diversion apparatus, with a single actuator, all the functions of the five three-way valves of FIG. 3. FIG. 9 is only one of several alternatives which may be used within the scope of this invention to combine such functions. Flow paths $F_1$, $F_2$, $P_1$ and $P_2$ are indicated, cast or machined into stator 9(a). The flow paths are separated by cylindrical walls indicated by the hatching. Piping or tubing connections to one or more series of EDR or EDIR stacks communicate at one or more points in each flow path from (say) the underside of stator 9(a) as shown in FIG. 9(h). The side of the stator of FIG. 9(a) having such flow paths and adjacent to the rotor is covered by a disc (e.g. a graphite disc) having the openings shown by the small circles and also as shown in FIG. 9(h). At 1:30 and 7:30 tunnels are shown which, without communicating with each other, interchange the flow paths of streams $F_1$ and $F_2$. At 4:30 and at 10:30 tunnels are shown which, also without communicating with each other, interchange the flow paths $P_1$ and $P_2$. The above mentioned tunnels are illustrated in FIG. 9(e) (which is a section of FIG. 9(a) from 10:30 to 4:30) and in FIG. 9(f) which is a section at a—a of FIG. 9(a).

The disc covering the rotor side of stator 9(a) may be welded (including solvent welding), screwed or bolted to stator 9(a) or otherwise affixed to the latter or may be an integral part of the stator.

Figure 9B:
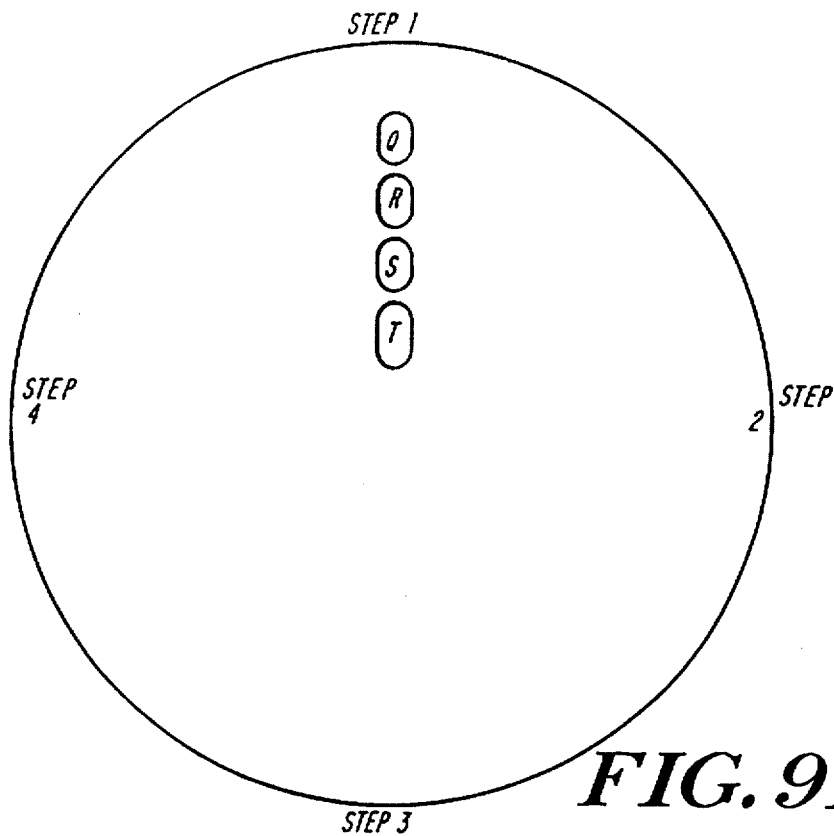
FIGS. 9$a$–$h$ are highly schematic representation of one preferred embodiment of this invention, capable of repeatedly interchanging the dilute and concentrated streams of one or more EDR and/or EDIR stacks and diverting off-specification dilute stream during such interchange.
Figure 9A:
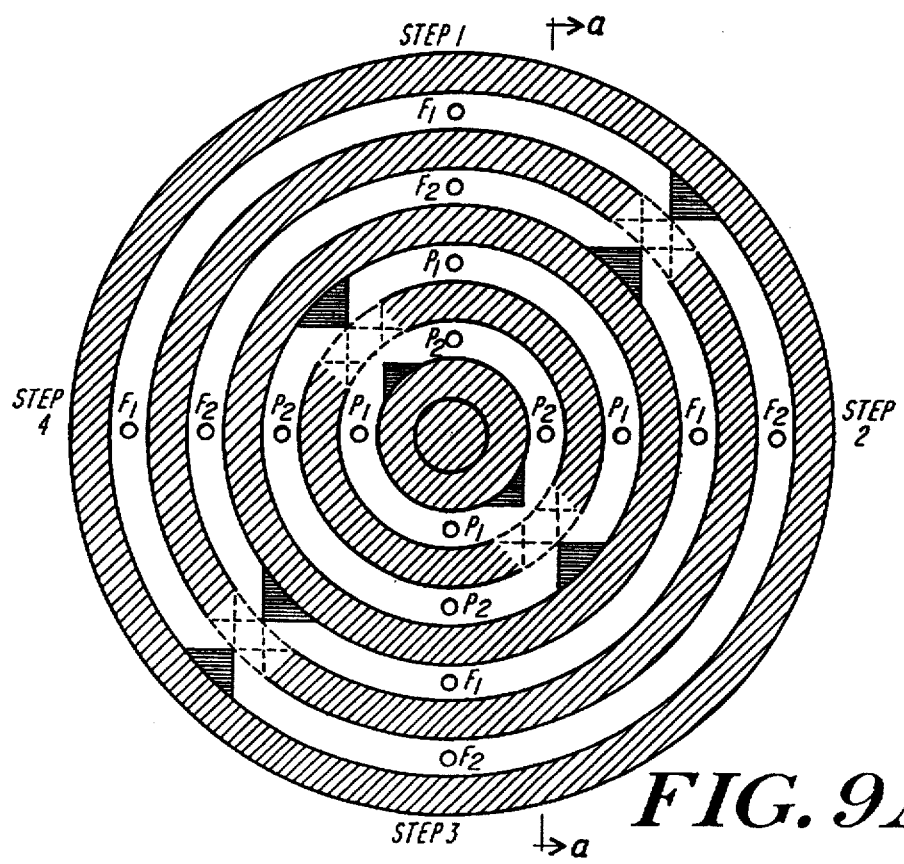
Figure 9C:
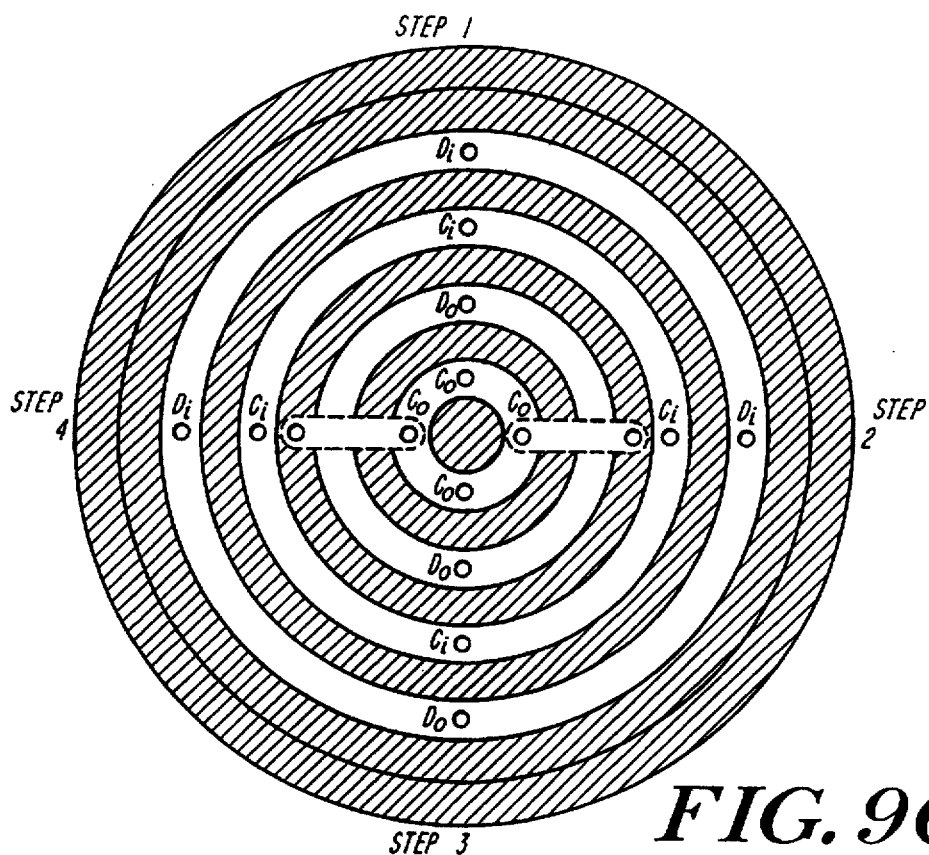
Figure 9D:
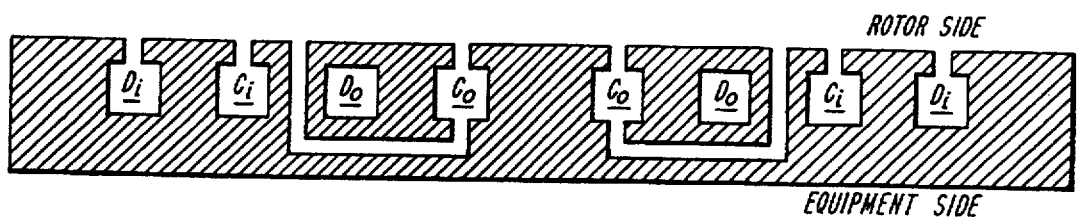
Figure 9E:
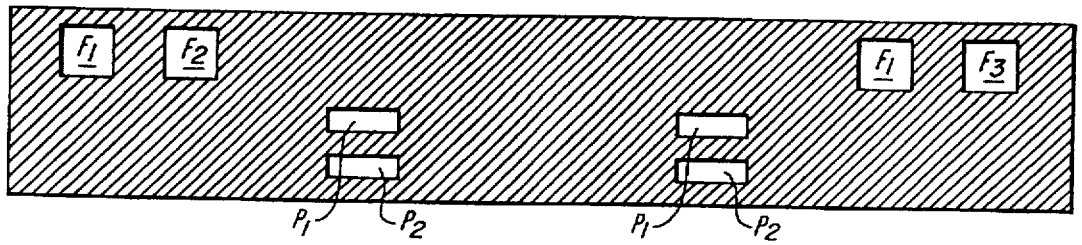

FIG. 9(b) shows schematically a rotor providing conduit means Q,R, S and T. FIG. 9(a) illustrates a second stator, constructed as discussed in connection with FIG. 9(a) and having flow paths ($D_i$) for inlet to the diluting compartments of an EDR or EDIR stack; concentrate compartments inlet ($C_i$); dilute compartments outlet ($D_o$) and concentrate compartments outlet ($C_o$). At 3 and at 9 o'clock are indicated tunnels permitting, when engaged by conduit means S, the flows of both $P_1$ and $P_2$ to bypass $D_o$ and instead join $C_o$ (i.e. to send any off-specification dilute effluent to the concentrate stream). The side of the stator of FIG. 9(c) having the flow paths and adjacent to the rotor is covered by a disc having the openings shown by the small circles and also as shown in FIGS. 9(d) and 9(g). FIG. 9(d) is a section of FIG. 9(c) from 9 to 3 o'clock and illustrates the tunnels in stator 9(c) referred to above. FIG. 9(g) is a section of FIG. 9(c) from 12 to 6 o'clock and illustrates the connections of the flow paths to the hydraulic equipment servicing the EDR or EDIR stacks. The flow diversion device of FIG. 9 can service several EDR and/or EDIR stacks arranged in a series and/or parallel array.

In operation, obverse steady state operation is obtained when the conduit means of FIG. 9(b) are at 12 o'clock. After the desired period of operation, the polarity of the electric current is reversed and shortly thereafter (as discussed in connection with FIG. 3), rotor 9(b) rotates clockwise to 3 o'clock permitting a short interim operation in which both $P_1$ and $P_2$ flow to $C_o$. Such rotation also changes communication of $F_1$ and $D_i$ resp. $F_2$ and $C_i$ to $F_2$ and $D_i$ resp. $F_1$ and $C_i$. After the short interim operation rotor 9(b) rotates clock-wise to 6 o'clock, permitting steady-state operation in the reverse mode. After the desired period of operation, the polarity of the electric current is returned to the obverse direction and shortly thereafter rotor 9(b) is rotated to the 9 o'clock position, again permitting interim operation in which both $P_1$ and $P_2$ flow to $C_o$. Subsequently the rotor rotates clockwise to 12 o'clock, completing the cycle which is repeated endlessly.

It is preferred if the rotor 9(b) leaves the 12, 3, 6 and 9 o'clock positions at a rate which minimizes water hammer. Once having left such positions the rotor can move rapidly toward the next position. The EDR and/or EDIR stack(s) may be isolated from the hydraulic service system by stopping rotor 9(b) at any position between 12, 3, 6 and 9 o'clock.

In FIGS. 6, 7 and 8 the stators and rotors have been shown as circular discs. It will be obvious to those skilled in the art that such shape is not necessary. For example any or all of the eight 45° circular arcs which form the peripheries of the stators and/or rotors may be replaced with chords of circles or even with arcs having a negative (concave) curvature or any other shape desirable for aesthetic, manufacturing or use reasons, always leaving sufficient margin between the edge of the stator or rotor and the various conduits or apertures for sealing and mechanical strength purposes. Similarly the stators and rotor of FIG. 9 may have peripheries of any desired shape within which the patterns of 9(a), 9(b) and/or 9(c) may be inscribed.

The conduits of FIGS. 6(b) and 8(b) appear in the figures as if they penetrate completely from one surface of each rotor to the opposite surface. Such will be convenient in many cases. FIG. 10 illustrates alternatives which may be preferred in some cases. FIGS. 10(c) and 10(f) are useful conduit patterns when the apertures connected by the conduit are in the same stator. If all the apertures (which are connected by the various conduits) are in the same stator then the multi-stream flow diversion device may consist solely of one stator and one rotor. The dotted lines in FIGS. 10(b), 10(c), 10(d) and 10(f) suggest one method of fabricating the more complex shapes, e.g. the rotor may be fabricated from two or more layers which are solvent-welded, glued, bolted, screwed or otherwise affixed together.

Very complex multi-stream flow diversion can be handled by utilizing two or more rotors which may be in contact with each other or separated by one or more stators. If two such rotors are used then each can be driven by its own central drive shaft (which can be opposed, i.e. entering from opposite external stators or may be concentric, i.e. one drive shaft inside the other). Two or more such rotors may be each be driven through their peripheries by mechanisms discussed above. If the rotors are center driven, then the stators may be separated by tightly fitting "stand-off" rings and in such case, if the rotors are fluid tight against the inside of such standoff rings (e.g. by appropriate seals), then side-entering and/or exiting fluid connections may also be made.

We claim:

1. Apparatus for selecting at will connections from each of at least two inlet fluid streams, at least two of which streams flow simultaneously, to one or more exit stream means of a group of at least two exit stream means, said apparatus comprising at least one rotationally positionable first body, each said first body comprising an axis of rotation and at least one surface which surface is a surface of rotation of a line or curve about said axis of rotation of said first body, said surface juxtaposed to a surface of a second body which surface of said second body is also a surface of rotation of said line or curve about said axis of rotation of said first body, said first body providing at least a first and a second fluid flow conduit, each said conduit having a first end and a second end, at least the first end of each said conduit located in said one surface of said first body, said second body providing at least a first and a second fluid flow conduit, each said conduit of said second body having a first end and a second end, at least the first end of each said conduit of said second body terminating at said surface of said second body, said first ends of each said conduit in said first body and said first ends of each said conduit of said second body located in such predetermined positions that:

a) said first fluid flow conduit of said first body communicates with said first fluid flow conduit of said second body and said second fluid flow conduit of said first body communicates with said second fluid flow conduit of said second body; and b) when such first body is rotated around said axis by a predetermined angle then said first fluid flow conduit of said first body communicates with said second fluid flow conduit of said second body and said second fluid flow conduit of said first body communicates with said first fluid flow conduit of said second body, said apparatus also comprising means for rotationally positioning said first body with respect to said second body.

2. Apparatus according to claim 1 also comprising an electrodialysis stack having at least a first set and a second set of fluid flow compartments, the members of said first set alternating with the members of said second set, the members of said first set being diluting compartments and the members of said second set concentrating compartments when direct electric current is passed in a first direction through said stack, the members of said first set being concentrating compartments and the members of said second set diluting compartments when direct electric current is passed through said stack in a second direction opposite to said first direction, said first and second set of compartments optionally containing a body of ion exchange resin which body permits the flow of fluid therethrough, said apparatus additionally comprising first fluid conveyance means connecting said first conduit means of said second body to said first set of fluid flow compartments and second fluid conveyance means connecting said second conduit means of said second body to said second set of fluid flow compartments.

3. Apparatus according to claim 2 in which said electrodialysis stack comprises at least one end-block and said second body is integral with said at least one end-block.

4. Apparatus according to claim 2 also comprising:

a first fluid hold-up volume $V_1$ in liters consisting of the fluid holding capacity in liters of said first fluid conveyance means plus the fluid holding capacity in liters of said first set of fluid flow compartments;

a second fluid hold-up volume $V_2$ in liters consisting of the fluid holding capacity in liters of said second fluid conveyance means plus the fluid holding capacity in liters of said second set of fluid flow compartments;

first fluid control means for controlling the flow of fluid through said first set of fluid flow compartments at a predetermined rate $F_1$ in liters per second;

second fluid control means for controlling the flow of fluid through said second set of fluid flow compartments at a predetermined rate $F_2$ in liters per second;

activating means for activating at a time $t_1$ said means for rotationally positioning said first body with respect to second body;

means for changing at a time $t_2$ the direction said electric current passes through said stack where $t_2$ is not substantially greater than the larger of $t_2+V_3/F_1$ and $t_2+V_2/F_2$.

5. Apparatus according to claim 1 in which when said first body is rotated around said axis by said predetermined angle, said first fluid flow conduit provided by said first body communicates in part with said first fluid flow conduit of said second body and simultaneously in part with said second fluid flow conduit of said second body for a predetermined fraction less than 1 of said predetermined angle.

6. Apparatus according to claim 1 in which said surface of said first body contacts said surface of said second body by means of one or more gaskets affixed to said surface of said first body.

7. Apparatus according to claim 1 having at least inlet streams $C_i$, $D_i$, $P_1$ and $P_2$ which flow simultaneously and at least exit flow means $C_o$, $D_o$, $F_1$ and $F_2$ and in which in a first position of said first body, $C_i$ communicates with $F_1$, $D_i$ communicates with $F_2$, $P_1$ communicates with $C_o$ and $P_2$ communicates with $D_o$ and in a second position of said first body with respect to said second body $C_i$ communicates with $F_2$, $D_i$ communicates with $F_2$, $P_1$ communicates with $D_o$ and $P_2$ communicates with $C_o$.

8. Apparatus comprising:
 (a) an electrodialysis stack having at least a first set and a second set of compartments, each said compartment having first fluid channel means at a first end and second fluid channel means at a second end thereof, the members of said first set alternating with the members of said second set, the members of said first set being diluting compartments and the members of said second set concentrating compartments when direct electric current is passed in a first direction through said stack, the members of said first set being concentrating compartments and the members of said second set diluting compartments when direct electric current is passed through said stack in a second direction opposite to said first direction, said first and second set compartments containing at least one member of the group consisting of:
  (1) structures which induce convective mass transfer of electrolyte to and from the membranes of said stack; and
  (2) bodies of ion exchange resin each such body permitting the flow of fluid therethrough;
 (b) at least first and second valves, each valve selecting at will connections
  from each of at least two inlet streams at least two of which flow simultaneously,
  to at least two exit flow means of a group of at least two such exit flow means,
  each said valve comprising at least one rotationally positionable first body, each said first body comprising at least one surface of rotation juxtaposed to a surface of rotation of a second body, said first body having at least a first and a second fluid conduit, each said conduit having a first end and a second end, at least the first end of each said conduit located at said one surface of said first body, said second body of each said valve having at least a first and a second fluid conduit, each said conduit of said second body having a first end and a second end, at least the first end of each said conduit of said second body located at said surface of said second body, said first ends of each said conduit in said first body and said first ends of each said conduit of said second body located in such predetermined positions that:
   said first fluid conduit of said first body communicates with said first fluid conduit of said second body and said second fluid conduit of said first body communicates with said second fluid conduit of said second body; and
   if such first body is rotated by a predetermined angle then said first fluid conduit of said first body communicates with said second fluid conduit of said second body and said second fluid conduit of said first body communicates with said first fluid conduit of said second body;
  each said valve also comprising actuator means for rotationally positioning said first body with respect to said second body;
 (c) first fluid manifold means connecting said first conduit means of second body of said first valve to said first fluid channel means of said first set of compartments, second fluid manifold means connecting said second conduit means of said second body of said first valve to said first fluid channel means of said second set of compartments, third fluid manifold means connecting said first conduit means of said second body of said second valve to said second fluid channel means of said first set of compartments and fourth fluid manifold means connecting said second conduit means of said second body of said second valve to said second fluid channel means of said second set of compartments.

9. Apparatus according to claim 8 in which said electrodialysis stack also comprises a first end block at one end of said stack and a second end block at the other end of said stack and in which the second body of at least one of said valves is integral with one of said end blocks.

10. Apparatus according to claim 8 in which if said first body of at least one of said valves is rotated by said predetermined angler said first fluid conduit provided by said first body communicates in part with said first fluid conduit of said second body and simultaneously in part with said second fluid conduit of said second body for a predetermined fraction less than 1 of said predetermined angle.

11. Apparatus according to claim 8 also comprising:
 a first fluid hold-up volume $V_1$ in liters consisting of the fluid holding capacity in liters of said first fluid manifold means plus the fluid holding capacity in liters of said first set of compartments;
 a second hold-up volume $V_2$ in liters consisting of the fluid holding capacity in liters of said second fluid manifold means plus the fluid holding capacity in liters of said second set of compartments;
 a third fluid hold-up volume $V_3$ in liters consisting of $V_1$ plus the fluid holding capacity in liters of said third manifold means;
 a fourth fluid hold-up volume $V_4$ in liters consisting of $V_2$ plus the fluid holding capacity in liters of said fourth manifold means;
 first fluid control means for controlling the flow of fluid through said first set of compartments at a predetermined rate $F_1$ in liters per second;
 second fluid control means for controlling the flow through said second set of compartments at a predetermined rate $F_2$ in liters per second;
 activating means for activating at a time $t_1$ said actuator means for rotationally positioning said first body of said first valve with respect to said second body of said first valve;
 means for changing at a time $t_2$ the direction said electric current passes through said stack where $t_2$ is not substantially greater than the larger of $t_1+V_1/F_1$ and $t_1+V_2/F_2$;
 activating means for activating at a time $t_3$ said activator means for rotationally positioning said first body of said second valve with respect to said second body of said second valve where $t_3$ is not substantially greater than the larger of $t_1+V_3/F_1$ and $t_1+V_4/F_2$.

* * * * *